Figure 1:
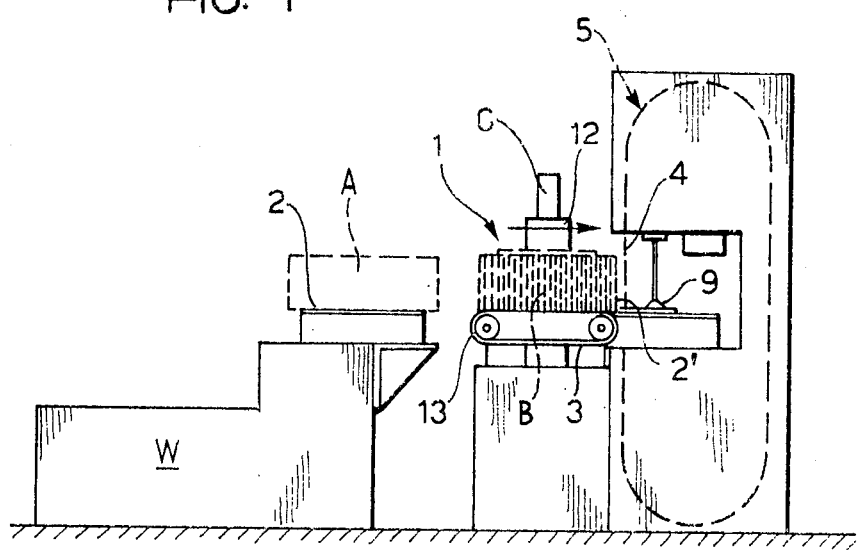

United States Patent [19]
di Rosa

[11] 4,280,575
[45] * Jul. 28, 1981

[54] APPARATUS FOR CUTTING AND METERING SLABS OR BALES OF UNVULCANIZED RUBBER

[75] Inventor: Gaetano di Rosa, Turin, Italy

[73] Assignee: Fata European Group S.p.A., Pianezza, Italy

[*] Notice: The portion of the term of this patent subsequent to Jan. 30, 1996, has been disclaimed.

[21] Appl. No.: 62,391

[22] Filed: Jul. 31, 1979

[30] Foreign Application Priority Data

Aug. 1, 1978 [IT] Italy .............................. 68833 A/78

[51] Int. Cl.³ .......................................... G01G 13/02
[52] U.S. Cl. ............................ 177/123; 177/DIG. 11
[58] Field of Search ................ 177/122, 123, DIG. 11

[56] References Cited

U.S. PATENT DOCUMENTS

| | | | |
|---|---|---|---|
| 3,690,391 | 9/1972 | Rust | 177/123 X |
| 4,010,809 | 3/1977 | Hobart | 177/123 X |
| 4,136,749 | 1/1979 | di Rosa | 177/DIG. 11 |

Primary Examiner—George H. Miller, Jr.
Attorney, Agent, or Firm—Sughrue, Rothwell, Mion, Zinn and Macpeak

[57] ABSTRACT

Apparatus is provided for cutting and metering slabs or bales of unvulcanized rubber to be fed to a single rubber mixing machine. The apparatus includes a conveyor belt and a carriage arranged to transport bales of rubber along parallel paths. A cutting machine is positioned to cut a slice off a bale carried by said carriage. By arranging for the carriage to undergo back and forth movement while intermittently effecting transverse feed of the bale, the cutting machine cuts a succession of slices off the one bale. To make up a load of rubber of a required weight, whole bales are transferred to a hopper via the conveyor belt until a weighing machine indicates that the required weight has almost been reached; thereafter the cut slices of rubber are added to the hopper under the control of the weighing machine to make up the weight required.

5 Claims, 3 Drawing Figures

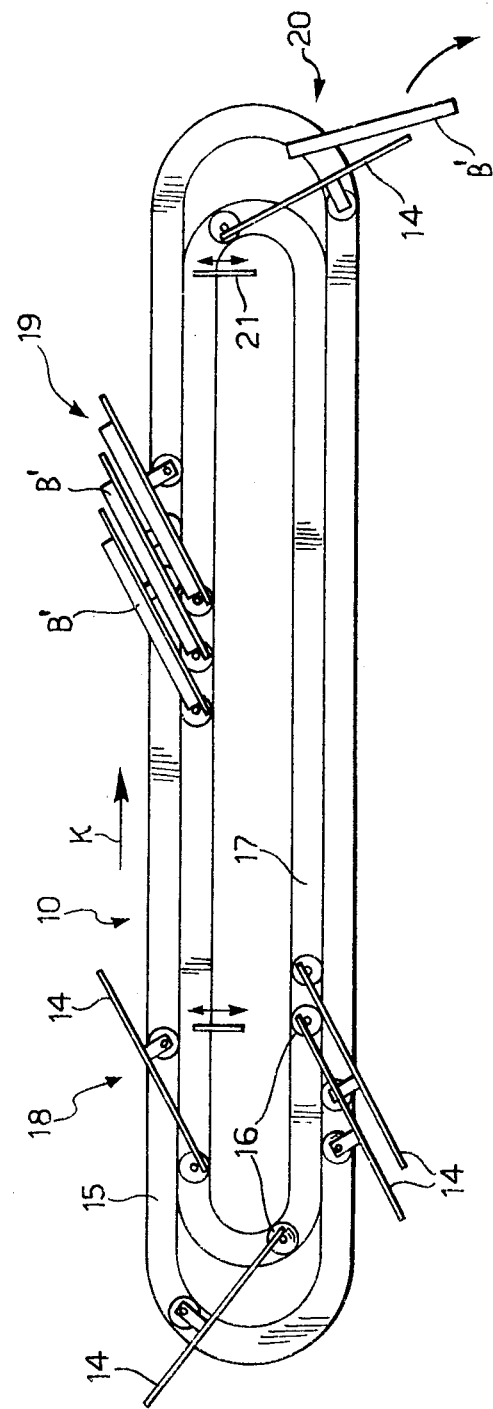

APPARATUS FOR CUTTING AND METERING SLABS OR BALES OF UNVULCANIZED RUBBER

The present invention relates to apparatus for cutting and metering slabs or bales of unvulcanised rubber (or caoutchouc) to be fed to a rubber mixing machine.

German Published Patent Application No. 28 13 953 in the name of F.A.T.A. Fabbrica Apparecchi di Sollevamento e Trasporto ed Affini S.p.A.) describes apparatus for cutting and metering slabs or bales of unvulcanised rubber, which through a network of basket-type intermediate conveyors serves to feed a number of rubber mixing machines. In the embodiment illustrated in FIGS. 24 to 26 of said Application, the apparatus is provided with first and second bale carriers arranged to transport slabs or bales of rubber in a common direction to feed first and second cutting machines respectively. The first bale carrier is formed by a pair of conveyor belts which pass on respective sides of the operating part of the first cutting machine so that a slab or bale transported by the first carrier is divided into two equal parts. The second carrier is formed by a carriage which moves to and fro in a direction parallel to that of the belts of the first carrier and which is also arranged to displace a slab or bale carried thereby in equal steps transversely with respect to the second cutting machine; as a result the second cutting machine can cut successive slices of unvulcanised rubber from the slab or bale in the carriage. Downstream of the first and second bale carriers there are respectively provided first and second output conveyors arranged to transfer the pieces cut by the two cutting machines to a hopper. Associated with the hopper is an automatic weighing machine which controls the second output conveyor. The hopper feeds the conveyor baskets which transfer the rubber to the various rubber mixing machines.

The metering of the unvulcanised rubber is carried out by first loading onto the automatic weighing machine a certain number of half slabs from the first output conveyor until their total weight is just short of the required weight; the required weight is then made up by adding slices from the second output conveyor. The dividing into two of slabs carried out by the first cutting machine is necessary is order to reduce the size of the pieces fed to the baskets of the conveyors associated with the various mixing machines, the object being to ensure correct filling of these baskets.

In the rubber industry there are also cases in which it is required to feed metered amounts of rubber to a single rubber mixing machine. For such cases the above described apparatus is excessively complicated and costly.

It is therefore an object of the present invention to provide apparatus for cutting and metering slabs or bales of unvulcanised rubber, prior to their feeding to a single rubber mixing machine, which is both simple and economic.

According to the present invention, there is provided apparatus for cutting and metering slabs or bales of unvulcanised rubber to be fed to a single rubber mixing machine, the apparatus comprising a cutting machine, a first bale carrier in the form of a single conveyor belt for carrying whole slabs or bales of unvulcanised rubber in a predetermined direction of conveyance, a second bale carrier in the form of a carriage movable to and fro in a direction parallel to said predetermined direction in order to feed a said slab or bale to said cutting machine, said carriage being arranged to effect displacement of said slab or bale in equal steps transversely with respect to the cutting machine to enable the cutting of successive slices from said slab or bale, a first output conveyor positioned downstream of said conveyor belt and arranged to receive whole slabs or bales therefrom, a second output conveyor positioned downstream of the cutting machine and arranged to receive said slices, and a weighing station arranged to receive rubber off both said output conveyors, the weighing station including an automatic weighing machine controlling the operation of said second output conveyor.

The metering of the unvulcanised rubber is carried out by feeding to the weighing station a sufficient number of whole slabs from the first output conveyor to reach a value just short of the required weight, and then adding a certain number of slices from the second output conveyor.

Figure 2:
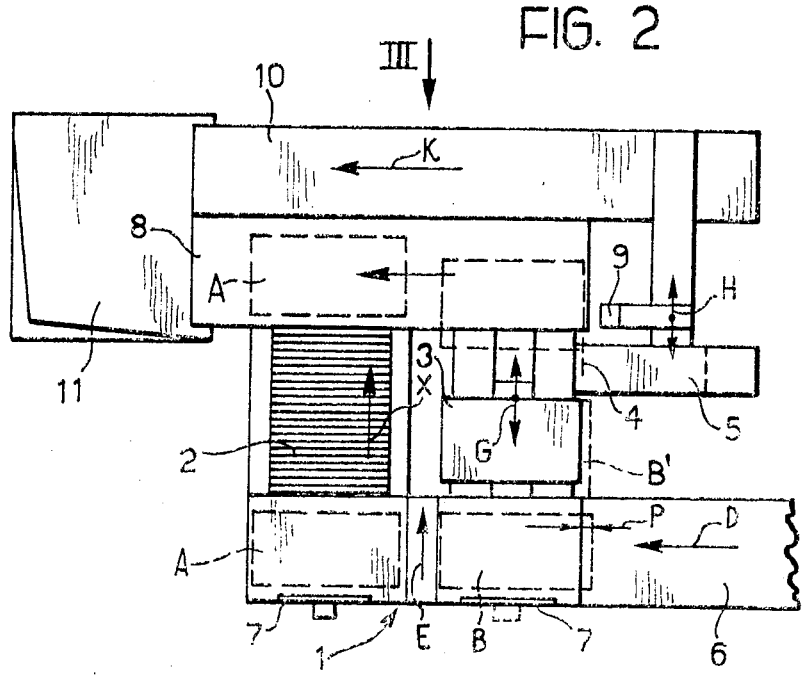

Apparatus embodying the invention and for cutting and metering rubber to be fed to a rubber mixing machine, will now be particularly described, by way of example only, with reference to the accompanying diagrammatic drawings, in which:

FIG. 1 is a front elevation of the apparatus;
FIG. 2 is a plan view of the apparatus; and
FIG. 3 is an enlarged view taken in the direction of arrow III in FIG. 2.

As shown in the drawings, the apparatus comprises a dual-path rubber bale transporter 1 provided with first and second bale carriers arranged to transport bales or slabs of rubber A and B along parallel paths. The first bale carrier is in the form of a conveyor belt 2 arranged to convey bales A in a direction X. The second bale carrier is a carriage 3 which moves to and fro in a direction G, parallel to the direction X, in order to feed bales B to a band sawing machine 5. In addition to its movement in direction G jointly with the carriage 3, a bale B carried by the carriage can be displaced transversely of the direction G in equal steps p by means of a belt 13 mounted on the carriage; such movement serves to displace the slab B transversely with respect to the working section 4 of the continuous blade of the band sawing machine 5. The continuous blade of the sawing machine 5 is of the type with non-set teeth, i.e. teeth lying in the plane of the blade itself.

The rubber bales or slabs A, B are fed to the dual-path bale transporter 1 by a feed device 6 which moves the slabs A, B in the direction shown by arrow D in FIG. 2 into positions aligned with the conveyor belt 2 and the carriage 3. The downstream end portion of the feed device 6 is provided with a pair of thrusters 7 which operate to push the slabs A and B in the direction of arrow E towards the conveyor belt 2 and towards the carriage 3 respectively.

Situated downstream of the conveyor belt 2 is a first output conveyor 8 which is arranged to receive bales A from the conveyor belt 2.

Downstream of the sawing machine 5 is located a carrier 9 which is arranged to transport slices cut off a slab B by the sawing machine 5, in the direction H to a second output conveyor 10 extending alongside the first output conveyor 8.

As illustrated in FIG. 3, the second output conveyor 10 is formed by a series of inclined plates 14 whose movement is controlled by an endless chain 15. To this end an intermediate part of each inclined plate 14 is articulated to the chain 15. One end of each inclined plate 14 is connected to a roller 16 running in an endless guide 17 situated on the inside of the chain 15. With the chain 15 circulating in the sense indicated by arrow K, each inclined plane 14 passes successively through a loading zone 18, a storage zone 19 and a discharge zone 20, this latter zone being arranged in the region of reversal of the chain 15.

The first and second output conveyors 8 and 10 both feed a hopper 11 of a weighing station. Associated with the hopper 11 is an automatic weighing machine W of known type, which is operative to control the advance of the conveyor 10. The hopper 11 directly feeds a rubber mixing machine which is not illustrated in the drawings.

Operation of the apparatus will now be described.

The feed device 6 advances two slabs A and B of unvulcanised rubber to the positions aligned with respective thrusters 7. Slab A is transferred by actuation of the corresponding thruster 7 onto the conveyor belt 2 which serves to transport the slab A onto the first output conveyor 8. The conveyor 8 transfers the slab A to the hopper 11.

The slab B is transferred into the carriage 3 by operation of the corresponding thruster 7 and is held fast in the carriage by means of a clamping device movable in the direction indicated by arrow C. The clamping device 12 is arranged to move incrementally in the direction indicated by arrow L simultaneous with the transverse step displacement of a bale B effected by means of the belt 13.

As a result of the to and fro movement of carriage 3 in the direction of arrow G and of the step displacement p effected by the belt 13, equal slices B' are cut from slab B and are transferred one by one to the carrier 9. The carrier 9 in turn transfers the slices B' onto the second output conveyor 10.

Each of the slices B' is placed on one of the inclined plates 14 situated in the loading zone 18.

The chain 15 of the second output conveyor 10 moves the loaded plates 14 into the storage zone 19 until the first plate 14 is halted by a stop 21. At this point the loaded plates 14 halt, releasing themselves from the chain 15. The stop 21 is controlled by the automatic weighing machine W to control the number of loaded plates 14 allowed to pass into the discharge zone 20 to discharge slices B into the hopper 11.

The metering of the rubber into the hopper 11 is carried out by loading into the hopper 11 a sufficient number of whole slabs A from the first output conveyor 8 to reach a value (measured by the automatic weighing machine W) just short of the required weight, and then adding a certain number of slices B' from the second output conveyor 10. Using the described apparatus to load a required weight of rubber into the hopper by first loading in the greater part of the required weight using large elements and then loading in the remaining part by the addition of small elements, resolves both the problem of handling a highly adhesive material such as cut unvulcanised rubber, and the problem of obtaining of sufficiently small sliced elements with the continuous-blade sawing machine 5, the teeth of which are non-set.

Cutting using the sawing machine 5 enables slices to be obtained with a thickness of about 5 mm, which may easily be handled as they have a regular surface and are of sufficient size to be grasped by means of the carrier 9 which transfers one slice at a time to the conveyor 10.

The slab B from which slices B' are cut is not completely divided up into slices on account of the difficulty of advancing and guiding the remaining part for cutting when this becomes small in size. Slices B' are therefore cut from about only half of a slab B, the remaining part being automatically ejected from the carriage 3 onto the first output conveyor 8.

I claim:

1. Apparatus for cutting and metering slabs or bales of unvulcanised rubber to be fed to a rubber mixing machine, said apparatus comprising in combination:
   a cutting machine,
   a first bale carrier in the form of a single conveyor belt for carrying whole bales of unvulcanised rubber in a predetermined direction of conveyance,
   a second bale carrier for removing whole bales from said conveyor belt and being in the form of a carriage movable to and fro in a direction perpendicular to said predetermined direction in order to feed a said bale to said cutting machine, said carriage also having means for effecting displacement of said bale in equal steps transversely with respect to the cutting machine to enable the cutting of successive slices from said bale,
   a first output conveyor positioned downsream of said conveyor belt and arranged to receive whole bales therefrom,
   a second output conveyor positioned downstream of the cutting machine and arranged to receive said slices, and
   a weighing station arranged to receive rubber off both said output conveyors, the weighing station including an automatic weighing machine controlling the operation of said second output conveyor.

2. Aparatus according to claim 1, wherein the cutting machine has an associated carrier arranged to transfer slices onto the second output conveyor.

3. Apparatus according to claim 1, wherein the second output conveyor is formed by a series of inclined plates the movements of which are controlled by an endless conveying member operative to move each plate successively through a loading zone, a storage zone and a discharge zone, said latter zone being situated in a region of reversal of said endless conveying member.

4. Apparatus according to claim 1, including a respective thruster arranged in the region of the upstream end of each of the said first and second bale carriers and operative to feed a bale to its associated carrier.

5. Apparatus according to claim 1, wherein the cutting machine is a continuous-blade band sawing machine with the teeth of its blade lying in the plane of the blade itself.

* * * * *